United States Patent [19]
Wang

[11] Patent Number: 5,222,580
[45] Date of Patent: Jun. 29, 1993

[54] HYDRAULIC CYLINDER FOR A PHYSICAL EXERCISE EQUIPMENT

[75] Inventor: John Wang, Chiaya, Taiwan

[73] Assignee: Lee Wang Industry Ltd., Chiayi Hsien, Taiwan

[21] Appl. No.: 991,565

[22] Filed: Dec. 16, 1992

[51] Int. Cl.$^5$ .............................................. F16F 9/00
[52] U.S. Cl. .................................. 188/321.11; 92/118; 403/193; 403/263; 482/53; 482/113; 267/118
[58] Field of Search ...................... 92/117, 118, 169.1; 403/193, 195, 196, 244, 242, 263; 482/53, 111, 112, 113; 188/321.11; 267/118

[56] References Cited

U.S. PATENT DOCUMENTS

| 3,868,192 | 2/1975 | Pennington et al. | 403/263 |
| 4,030,847 | 6/1977 | Carmien | 403/263 |
| 4,389,134 | 6/1983 | Colas | 403/263 |

FOREIGN PATENT DOCUMENTS 2006916  5/1979  United Kingdom .......... 188/321.11

Primary Examiner—Thomas E. Denion
Attorney, Agent, or Firm—Harness, Dickey & Pierce

[57] ABSTRACT

A hydraulic cylinder for a physical exercise equipment includes a cylinder body, a piston rod which extends outward from the cylinder body and which has an annular groove that is formed circumferentially in an outer end portion of the piston rod, and a coupling mechanism which includes a flexible end sleeve and a cylindrical metal retaining element. The end sleeve has a pivot joint tubular portion and a tubular protrusion which projects radially from the pivot joint tubular portion. The tubular protrusion is formed with a receiving recess which receives the outer end portion of the piston rod therein. The pivot joint tubular portion has a pivot bore formed therethrough so that a pivot pin can extend therethrough. The cylindrical metal retaining element has a pressed diameter-reduced portion which is sleeved on and which presses against the tubular protrusion in such a manner that the tubular protrusion has a portion squeezed into the annular groove of the piston rod so as to retain the end sleeve on the piston rod.

2 Claims, 5 Drawing Sheets

HYDRAULIC CYLINDER FOR A PHYSICAL EXERCISE EQUIPMENT

BACKGROUND OF THE INVENTION

1. Field Of The Invention

This invention relates to a hydraulic cylinder for a physical exercise equipment, more particularly to a hydraulic cylinder which has an improved end sleeve that provides a simple and secure connection between the improved end sleeve and the cylinder body.

2. Description Of The Related Art

Presently, there are many types of physical exercise equipments that are provided with at least one hydraulic cylinder. As illustrated in FIG. 1, a stepper (A) includes a base frame (A1); two pedal units (A2) mounted pivotally on the base frame (A1) so as to move between an upper limit and a lower limit; two conventional hydraulic cylinders (A3), each of which is connected pivotally to the base frame (A1) at one end and is connected pivotally to one pedal unit (A2) at the other end; and a reciprocating assembly (A4) attached to the base frame (A1) and having two reciprocating cranks (A5) which abut respectively against the pedal units (A2) in such a manner that when one of the pedal units (A2) is depressed so as to move to the lower limit, the other one of the pedal units (A2) is moved to the lower limit. The hydraulic cylinders (A3) provide a resistance against the pedal units (A2) when the pedal units (A2) are depressed.

Referring to FIGS. 2 and 3, the above-described conventional hydraulic cylinder (A3) includes a cylinder body (B) which has a hollow rivet bar (B1) that projects axially outward from an end of the cylinder body (B); a piston rod (C) which extends outward from the other end of the cylinder body (B) that is away from the hollow rivet bar (B1), said piston rod (C) having a hollow rivet bar (C1) projecting axially outward from the outer end thereof; and two coupling units (D) mounted respectively on the rivet bars (B1,C1). One of the coupling units (D) has a cylindrical end sleeve (D1) with two open ends. The end sleeve (D1) has a pair of diametrically opposite radial holes (D2,D3) formed in the curved side surface thereof. The hole (D3) has a diameter that is greater than that of the hole (D2) and permits the extension of the hollow rivet bar (C1) of the piston rod (C) therethrough. A rivet beater (not shown) extends through the hole (D3) so as to beat the hollow rivet bar (C1) of the piston rod (C), thereby retaining the end sleeve (D1) on the piston rod (C). The coupling unit (D) further includes two tubular pivot joint rubber cushions (D4,D5) which are pressed to fit in the open ends of the end sleeve (D1), respectively. Each of the two rubber cushions (D4,D5) has an axial bore (D6,D7) thereby permitting a pivot pin (not shown) of a physical exercise equipment (such as the stepper shown in FIG. 1) to extend therethrough. Since the two coupling units (D) have the same structure, the other one of the coupling units (D) is retained on the cylinder body (B) by connecting the corresponding end sleeve (D1) with the rivet bar (B1) so that the hydraulic cylinder (A3) can be connected pivotally to the base frame (A1) of the stepper (A) at one end and to one pedal unit (A2) at the other end, as illustrated in FIG. 1.

The main drawback of the above-described conventional hydraulic cylinder is that the hole (D3) is too small for a beater to extend therethrough so as to beat the hollow rivet bar (C1) of the piston rod (C), thereby causing undesired deformation of the piston rod (C).

SUMMARY OF THE INVENTION

Therefore, the main object of this invention is to provided a hydraulic cylinder which has an improved end sleeve that provides a simple and secure connection between the improved end sleeve and the cylinder body so as to overcome the drawback of the conventional hydraulic cylinder.

According to this invention, a hydraulic cylinder for a physical exercise equipment includes a cylinder body, a piston rod which extends outward from the cylinder body and which has a first annular groove formed circumferentially in an outer end portion of the piston rod, and a first coupling mechanism. The first coupling mechanism includes a first flexible end sleeve and a first cylindrical metal retaining element. The first flexible end sleeve has a first pivot joint tubular portion and a first tubular protrusion which projects radially from the first pivot joint tubular portion. The first tubular protrusion has a first receiving recess formed in an outer end surface thereof. The first receiving recess receives the outer end portion of the piston rod therein. The first pivot joint tubular portion has a pivot bore formed therethrough so that a pivot pin can extend therethrough. The first cylindrical metal retaining element has an inward flange which projects radially and inwardly from an end of the first retaining element so that the outer end portion of the piston rod extends through the inward flange of the first retaining element and into the first receiving recess of the first tubular protrusion. The first cylindrical metal retaining element further has a first pressed diameter-reduced portion which is sleeved on and which presses against the first tubular protrusion in such a manner that the first tubular protrusion of the first end sleeve has a portion squeezed into the first annular groove of the piston rod so as to retain the first end sleeve on the piston rod.

BRIEF DESCRIPTION OF THE DRAWINGS

Other features and advantages of the present invention will become apparent in the following detailed description of the preferred embodiment, with reference to the accompanying drawings, of which.

DETAILED DESCRIPTION OF THE PREFERRED EMBODIMENT

Figure 4:
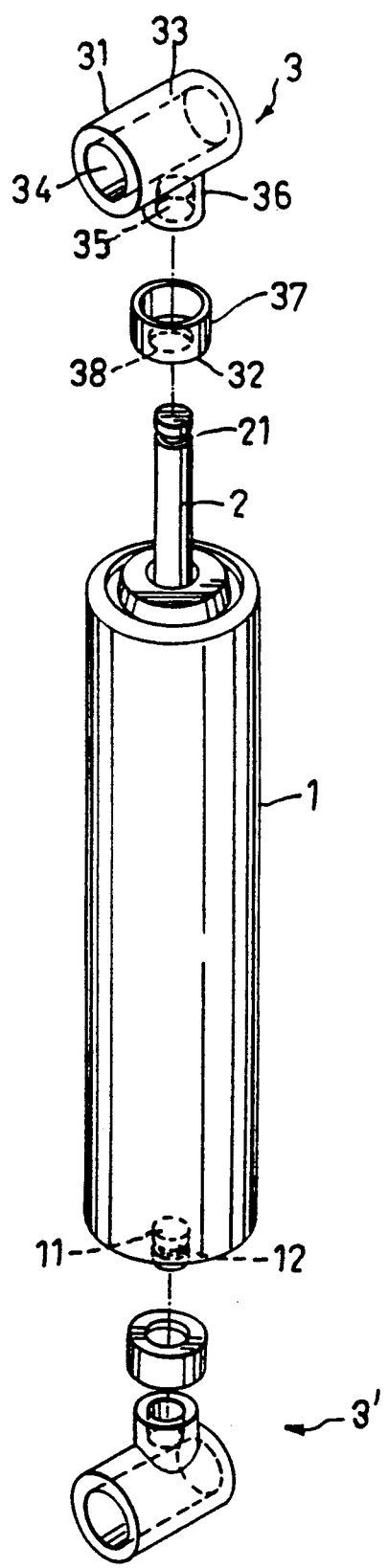
FIG. 4 is a partly exploded view of a hydraulic cylinder for a physical exercise equipment according to this invention.
Figure 5:
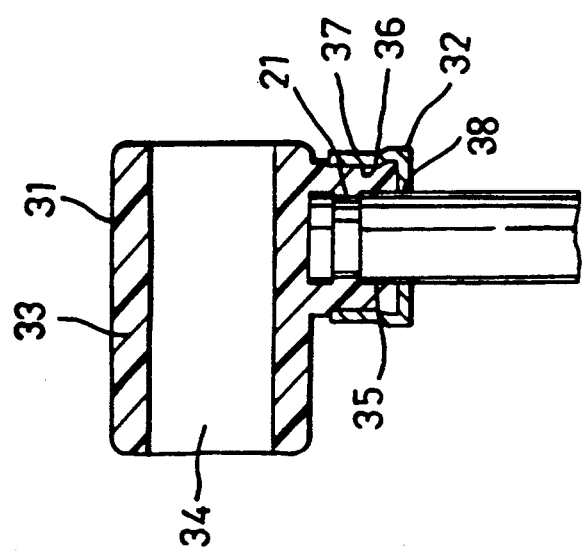
FIG. 5 is an enlarged partly sectional view which shows the outer end portion of the piston rod of the hydraulic cylinder according to this invention.

Referring to FIGS. 4 and 5, a hydraulic cylinder for a physical exercise equipment according to this invention includes a cylinder body (1) which is provided with an engaging projection (11), a piston rod (2) which extends outward from the cylinder body (1) and which has a first annular groove (21) formed circumferentially in an outer end portion of the piston rod (2), a first coupling mechanism (3) coupled with the piston rod (2) and a second coupling mechanism (3') coupled with the engaging projection (11).

The engaging projection (11) of the cylinder body (1) projects axially outward from an end of the cylinder body (1) which is away from the piston rod (2), and has a second annular groove (12) formed in an outer end portion of the engaging projection (11).

Figure 1:
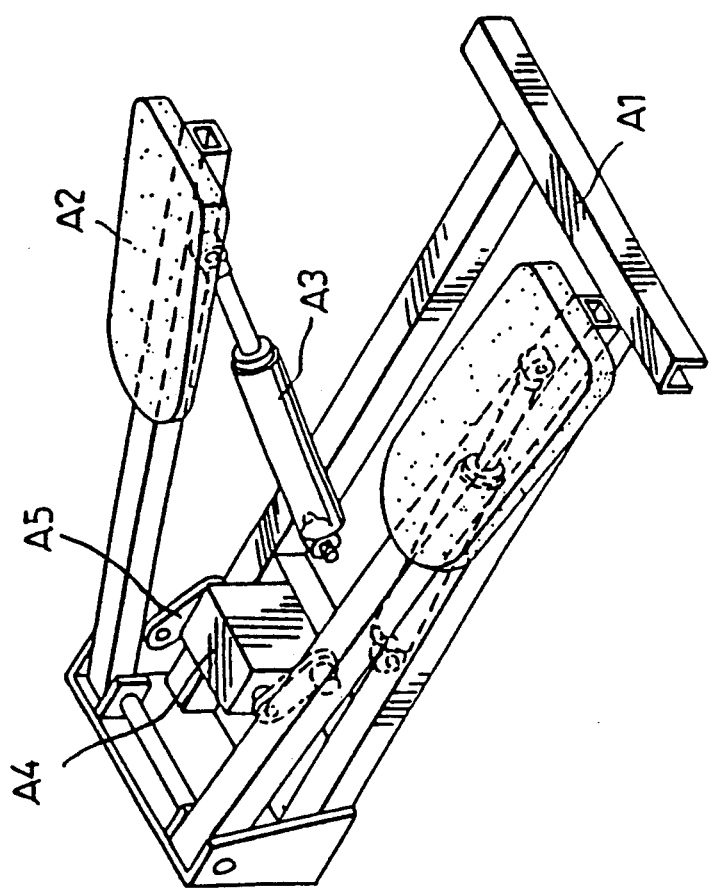
FIG. 1 is a perspective view showing a conventional physical exercise equipment which is provided with a pair of conventional hydraulic cylinders.
Figure 2:
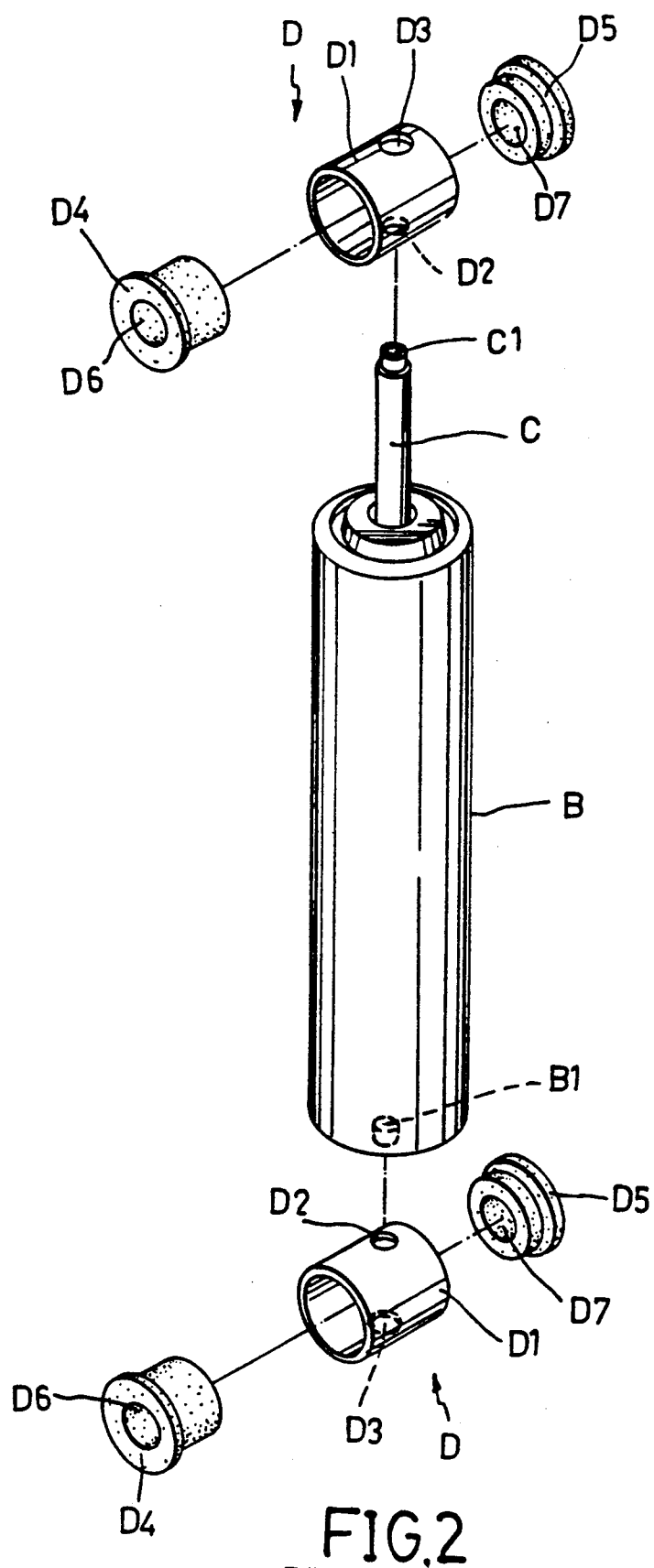
FIG. 2 is a partly exploded view of the conventional hydraulic cylinder.
Figure 3:
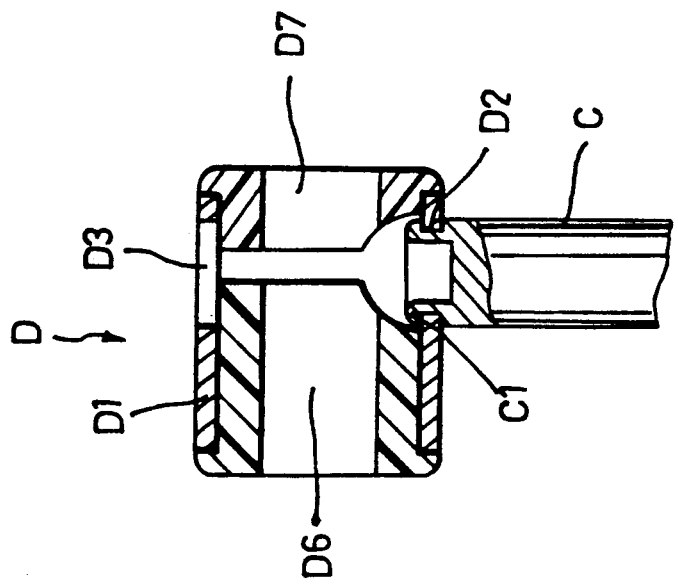
FIG. 3 is an enlarged partly sectional view which shows the outer end portion of the piston rod of the conventional hydraulic cylinder.

The first mechanism (3) includes a first flexible end sleeve (31) and a first cylindrical metal retaining element (32). The first flexible end sleeve (31) has a first pivot joint tubular portion (33) and a first tubular protrusion (35) which projects radially from the first pivot joint tubular portion (33). The first tubular protrusion (35) has a first receiving recess (36) formed in an outer end surface thereof. The first receiving recess (36) receives the outer end portion of the piston rod (2) therein. The first pivot joint tubular portion (33) has a pivot bore (34) formed therethrough so that a pivot pin (not shown) of a physical exercise equipment (such as the stepper shown in FIG. 1) can extend therethrough. The first cylindrical metal retaining element (32) has an inward flange (38) which projects radially and inwardly from an end of the first retaining element (32) so that the outer end portion of the piston rod (2) extends through the inward flange (38) of the first retaining element (32) and into the first receiving recess (36) of the first tubular protrusion (35). The first cylindrical metal retaining element (32) further has a first pressed diameter-reduced portion (37) which is sleeved on and which presses against the first tubular protrusion (35) in such a manner that the first tubular protrusion (35) of the first end sleeve (31) has a portion that is squeezed into the first annular groove (21) of the piston rod (2) so as to retain the first end sleeve (31) on the piston rod (2). The second end sleeve (31) of the second coupling mechanism (3) is retained on the engaging projection (11) in a similar manner due to the likeness in the structures of the first and second coupling mechanisms. Accordingly, the hydraulic cylinder of this invention has a simple and secure connection between the cylinder body (1) and the two end sleeves (31), and can be connected operably to a physical exercise equipment (such as the stepper in FIG. 1).

While the present invention has been described in connection with what is considered the most practical and preferred embodiment, it is understood that this invention is not limited to the disclosed embodiment, but is intended to cover various arrangements included within the spirit and scope of the broadest interpretation so as to encompass all such modifications and equivalent arrangements.

I claim:

1. A hydraulic cylinder for a physical exercise equipment including a cylinder body, and a piston rod that extends outward from said cylinder body, the improvement comprising:

said piston rod having a first annular groove formed circumferentially in an outer end portion thereof; and a first coupling mechanism including a first flexible end sleeve and a first cylindrical metal retaining element, said first flexible end sleeve having a first pivot joint tubular portion and a first tubular protrusion which projects radially from said first pivot joint tubular portion, said first tubular protrusion having a first receiving recess formed in an outer end surface thereof, said first receiving recess receiving said outer end portion of said piston rod therein, said first pivot joint tubular portion having a pivot bore formed therethrough so that a pivot pin can extend therethrough, said first cylindrical metal retaining element having an inward flange which projects radially and inwardly from an end of said first retaining element so that said outer end portion of said piston rod extends through said inward flange of said first retaining element and into said first receiving recess of said first tubular protrusion, said first cylindrical metal retaining element further having a first pressed diameter-reduced portion being sleeved on and pressing against said first tubular protrusion in such a manner that said first tubular protrusion of said first end sleeve has a portion squeezed into said first annular groove of said piston rod so as to retain said first end sleeve on said piston rod.

2. A hydraulic cylinder as claimed in claim 1, wherein said cylinder body has an engaging projection which projects axially outward from an end of said cylinder body that is away from said piston rod, said engaging projection having a second annular groove formed in an outer end portion thereof, said hydraulic cylinder further comprising a second coupling mechanism which includes a second flexible end sleeve and a second cylindrical metal retaining element, said second flexible end sleeve having a second pivot joint tubular portion and a second tubular protrusion which projects radially from said second pivot joint tubular portion of said second end sleeve, said second tubular protrusion having a second receiving recess formed in an outer end surface thereof, said second receiving recess receiving said outer end portion of said engaging projection therein, said second pivot joint tubular portion of said second end sleeve having a pivot bore formed therethrough so that a pivot pin can extend therethrough, said second cylindrical metal retaining element having an inward flange which projects radially and inwardly from an end of said second retaining element so that said outer end portion of said engaging projection extends through said inward flange of said second retaining element and into said second receiving recess of said second tubular protrusion, said second cylindrical metal retaining element further having a second pressed diameter-reduced portion being sleeved on and pressing against said second tubular protrusion in such a manner that said second tubular protrusion has a portion squeezed into said second annular groove of said engaging projection so as to retain said second end sleeve on said cylinder body.

* * * * *